May 28, 1968  G. E. PLETCHER  3,385,431
GRAIN SEPARATOR WITH INSECT DESTROYER
Filed Jan. 27, 1965  2 Sheets-Sheet 1

INVENTOR
George E. Pletcher

May 28, 1968 G. E. PLETCHER 3,385,431
GRAIN SEPARATOR WITH INSECT DESTROYER
Filed Jan. 27, 1965 2 Sheets-Sheet 2

INVENTOR
George E. Pletcher 3,385,431
GRAIN SEPARATOR WITH INSECT
DESTROYER
George E. Pletcher, P.O. Box 784,
Perryton, Tex. 79070
Filed Jan. 27, 1965, Ser. No. 428,456
4 Claims. (Cl. 209—10)

ABSTRACT OF THE DISCLOSURE

An apparatus for destroying insects in grain, which apparatus includes a hopper from which grain is passed into the upper end of an inclined chute having a screen supported above its bottom. Insects and dust pass through the screen to the bottom of the chute and are discharged into an electrically heated pan which destroys the insects. The grain remaining on the screen is passed to an outlet chute and out of the device.

---

This invention relates to grain, and more particularly to grain having insects therein.

While any number of ways have been devised to destroy the insects in grain, the mechanisms so far offered people having need for this type of device have unfortunately been anything but satisfactory either because of complicated structure subject to failure by jamming of the grain or from the effects of the chemicals used therein since some of the insect destroyers use chemicals of questionable value.

It is therefore the principal object of this invention to provide a grain insect destroyer that employs a heater which will effectively destroy all of the insects in the grain without the danger of jamming on the grain that it is treating.

Another object of this invention is to provide a heater for destroying grain insects that can be made as either a fixed or portable machine.

Another object of this invention is to provide a heater for destroying grain insects that contains a minimum number of moving parts.

Another object of this invention is to provide a heater for destroying grain insects that can be operated by anyone.

Another object of this invention is to provide a heater for destroying grain insects that will not harm the grain but at the same time will destroy any kind of insects that may be in the same.

Another object of this invention is to provide a heater for destroying grain insects that can be constructed from easily obtainable parts available in nearly any city, town or hardware store.

Another object of this invention is to provide a heater for destroying grain insects that will also take out the grain dust caused by the insects as well as the very small pieces of the grain itself.

Still another object of this invention is to provide a heater for destroying grain insects that will treat any amount of grain one may care to run through the same.

Still another, but by no means the last object of this invention, is to provide a heater for destroying grain insects that can, when necessary, be repaired by anyone having a minimum knowledge of handling tools.

With these objects in view, and others as will appear as the description proceeds, the invention comprises various novel features of construction and arrangement of parts which will be more fully described hereinafter and set forth with particularity in the claims appended hereto.

Figure 4:
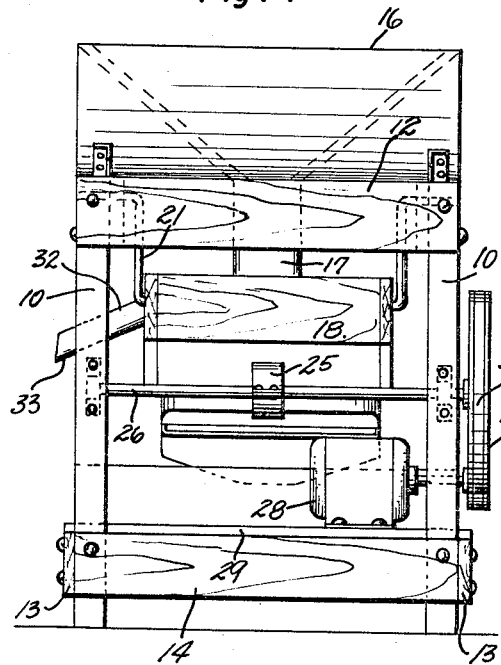
FIGURE 4 is a rear end view of this invention.
Figure 5:
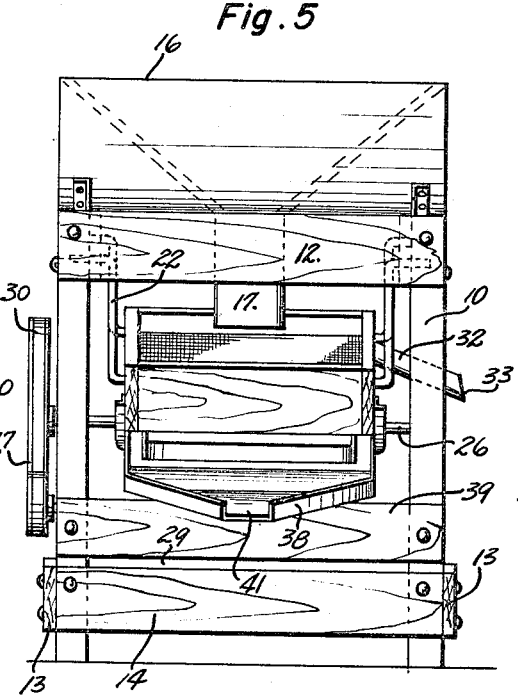
FIGURE 5 is a front end view of this invention.

The device shown in the above noted drawing comprises a tetrad of vertically disposed and spaced members 10 to which are secured the top horizontally disposed members 11, the top lateral members 12, the bottom horizontally disposed members 13 and the bottom lateral members 14 thereby providing a rectangular frame 15 in which is placed the mechanisms that go to make up this unique and useful invention. A wedge shaped grain receiving hopper 16 having a vertically disposed outlet 17 is mounted in the upper portion of the rear end 18 of the aforesaid rectangular frame 15 which is provided with a rectangular chute 19 having a wire screen 20 in the center of the major portion thereof. The aforesaid chute is swingably supported by U-shaped hangers 21 and 22. A shaker bar 23 is horizontally mounted under the aforesaid chute 19. The front end of the shaker bar 23 is hingedly connected to the cross-member 24 while the rear end of the same shaker bar is mounted on the crank 25 that is mounted on the lateral shaft 26 which is supported by two of the rear members 10. A large pulley 27 is mounted on one outer end of the aforesaid shaft 26 as one can readily see by examining FIGURE 4 of the drawings.

An electric motor 28 or its equivalent is mounted on the member 29 that has each end bolted to one of the aforesaid bottom members 13. A belt 30 encompasses part of the aforesaid large pulley 27 as well as part of the motor pulley 31 thereby providing means of shaking the rectangular chute 19 when the electric motor is activated in the usual manner.

Figure 1:
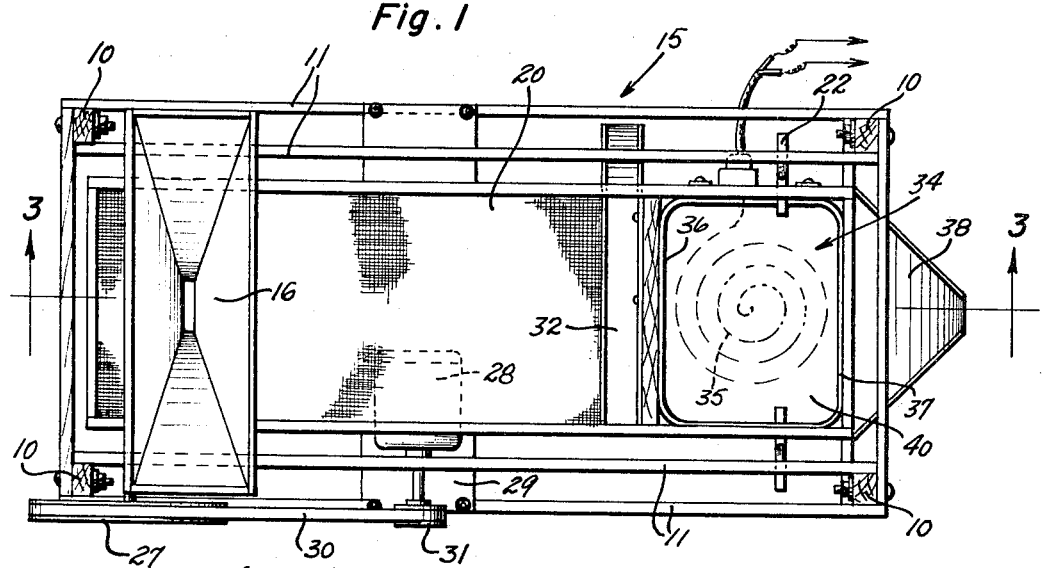
FIGURE 1 is a top view of this invention.
Figure 2:
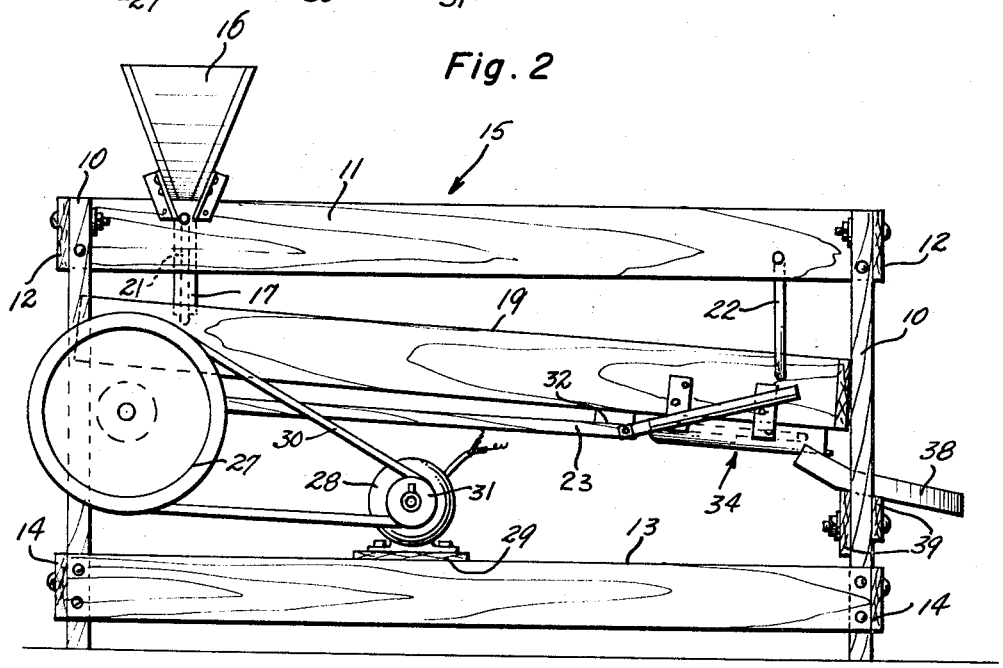
FIGURE 2 is a right side view of this invention.
Figure 3:
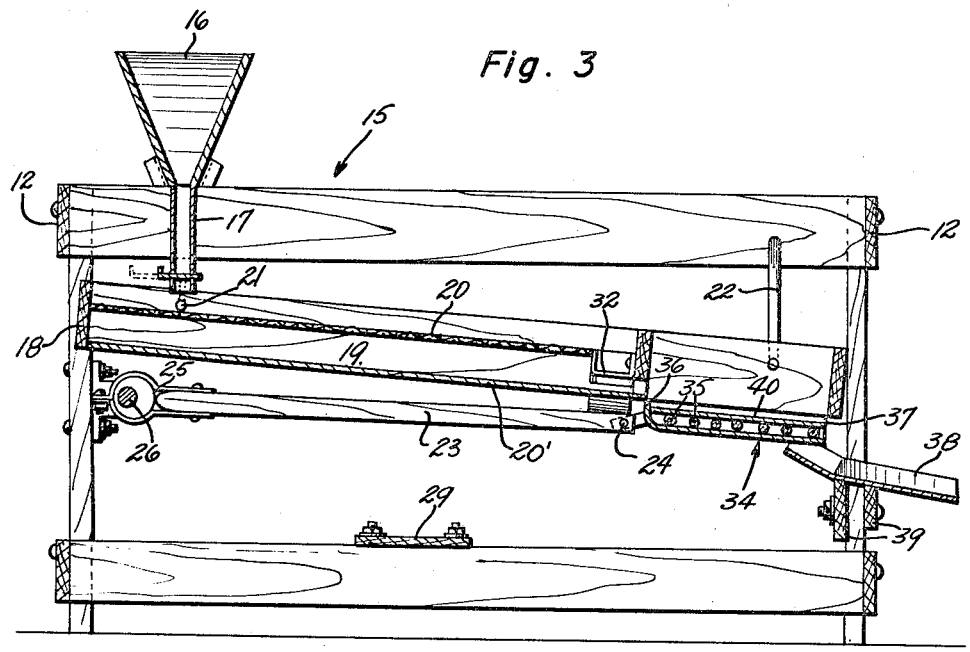
FIGURE 3 is a longitudinal sectional view of this invention take substantially along line 3—3 of FIGURE 1 and viewed in the direction indicated by the arrows.

Looking now at the front portion of FIGURE 3, it will be seen that the chute 19 is provided with a laterally disposed outlet chute 32 that is so angled as to permit the grain that is shaken down onto the aforesaid chute 32 to fall out into any desired container that is placed under the outer end 33. The container is not shown in any of the views of the drawings. The pan 34 is secured on the front end and underside of the aforesaid rectangular chute 19. A plurality of electric heating coils 35 is located directly under the just mentioned pan 34 in order to heat the pan and thus destroy any and all of the insects that are in the grain that has been placed in this invention and activated by the previously mentioned shaker bar 23. The aforesaid pan 34 is provided with an upturned edge 36 on three sides thereof, the edge is integral with the rest of the pan which has an open end 37 in order to permit the destroyed insects to fall down into the angularly disposed outlet chute 38 which rest on the two lateral members 39 that are connected at each end to one of the vertical members 10. This construction is shown in both FIGURES 2 and 3 of the appended drawings. Attention is directed at this time to the aforesaid FIGURE 3 where it can be seen that the previously mentioned electric heating coils 35 are actually located in the pan 34 which has a second bottom 40 that keeps the dust and insects off the coils while being destroyed by the heat. This construction is the same as if the electric heating coils were underneath the pan as previously stated.

The way in which this unique invention of mine works is quite simple. The grain from which the insects are to be removed by destroying them is placed in the hopper 16 from where it flows down through the outlet 17 onto the rectangular and angularly disposed chute 19 where its dust and small insects fall through the wire screen 20 on to its bottom 20′ from where they are shaken by the shaker bar 23 which has been activated by the turning on of the electricity to the electric motor 28 which is connected to the aforesaid shaker bar 23 by the previously described mechanism. The electric motor switch is not shown in any of the views of the drawings. The grain is shaken into the lateral chute 32 from which it falls into any suitable container as previously stated. The dust and small insects slide down into the aforesaid pan 34 which has already been heated by the turning on of the electricity to the heating coils 35 that are, as previously stated, located directly under the bottom of the aforesaid pan 34. The heat destroys the insects and most of the dust. The bodies of the insects and that dust which has not been destroyed by the heat is now shaken into the outlet chute 38 which has its outer end 41 located over any desired container which is not shown in any of the views of the drawings.

From the foregoing description of this invention taken in connection with the accompanying drawings, the advantages of the method of the operation of the apparatus shown will be readily understood by those skilled in the art to which this invention appertains, and while I have described the apparatus which I now consider to be the best embodiment thereof, I desire to have it understood that the apparatus shown is merely illustrative, and that such changes may be made when desired in so long as they fall within the scope of the appended claims.

Having now described my invention and the method of its operation, what I now claim as new and desire to secure by Letters Patent is:

1. A device for separating insects, organic dust and other particulate matter from grain and destroying, by heat, the insects and other organic matter which have been separated, comprising a rectangular frame, a hopper mounted above one end of the said frame, an inclined chute movably secured in said frame, said chute having a bottom, sides, an open lower end and a screen secured to said chute above the bottom, said screen being inclined the same as said chute and substantially the same size as said bottom, vibratory mechanism mounted on the frame and connected to the inclined chute to move said chute back and forth, a pan secured to the open end of said chute, said pan being in substantially the same plane as said bottom, means for heating said pan to destroy organic dust and small insects, an outlet chute extending angularly downward from the lower end of said pan, and a laterally disposed chute secured to said movable chute and located adjacent the uppermost side, and below the lower end of said screen, said laterally disposed chute to receive grain after it is separated from said dust, other particulate matter and small insects and to direct this grain downward.

2. The combination of claim 1 in which the hopper is wedge shaped and the outlet chute is secured to the frame.

3. The combination of claim 1 in which the chute is rectangular when viewed from the top.

4. The combination of claim 1 in which the pan has a false bottom below the bottom thereof and the means for heating the pan is an electric heater between said bottom and false bottom.

References Cited

UNITED STATES PATENTS

| | | | |
|---|---|---|---|
| 409,180 | 8/1889 | Ferguson | 209—235 X |
| 545,185 | 8/1895 | Yost | 209—344 X |
| 1,229,236 | 6/1917 | Cross | 209—235 X |
| 1,384,689 | 7/1921 | Davis | 209—238 X |
| 2,975,898 | 3/1961 | Nelson | 209—238 |
| 3,056,488 | 10/1962 | Musschoot | 209—365 X |
| 2,114,494 | 4/1938 | Hummel | 43—124 X |
| 2,988,624 | 6/1961 | Iseli-Bossardt | 21—91 X |

HARRY B. THORNTON, *Primary Examiner.*

R. HALPER, *Assistant Examiner.*